US005391430A

United States Patent [19]

Fabish et al.

[11] Patent Number: 5,391,430

[45] Date of Patent: Feb. 21, 1995

[54] THERMOSTATING FOIL-BASED LAMINATE MICROWAVE ABSORBERS

[75] Inventors: Thomas J. Fabish, Export; Arthur Benson, Pittsburgh; Thomas L. Levendusky, Greenburg; Barbara O. Hall, Monroeville; J. Glenn Davidson, Freeport; James E. Stillwagon, New Kensington, all of Pa.

[73] Assignee: Aluminum Company of America, Pittsburgh, Pa.

[21] Appl. No.: 902,883

[22] Filed: Jun. 23, 1992

[51] Int. Cl.[6] .......................... B32B 5/16; H05B 6/68

[52] U.S. Cl. .................................. 428/328; 219/728; 426/109; 426/107; 428/402; 428/402.24; 428/457; 428/402.2

[58] Field of Search .................. 219/10.55 E, 10.55 F, 219/10.55 M, 10.55 R; 428/328, 402.2, 325, 327, 457, 402, 402.24; 426/107, 109, 234, 243, 113

[56] References Cited

U.S. PATENT DOCUMENTS

| | | | |
|---|---|---|---|
| 4,190,757 | 2/1980 | Turpin et al. | 426/234 |
| 4,230,924 | 10/1980 | Brastad et al. | 219/10.55 E |
| 4,266,108 | 5/1981 | Anderson et al. | 219/10.55 E |
| 4,283,427 | 8/1981 | Winters et al. | 219/10.55 E |
| 4,641,005 | 2/1987 | Seiforth | 219/10.55 E |
| 4,810,845 | 5/1989 | Seaborne | 219/10.55 E |
| 4,888,459 | 12/1989 | Keefer | 219/10.55 E |
| 4,904,836 | 2/1990 | Turpin et al. | 219/10.55 E |
| 4,962,000 | 10/1990 | Emslander et al. | 219/10.55 E |
| 4,970,358 | 11/1990 | Brandberg et al. | 426/107 |
| 5,019,681 | 5/1991 | Lorence et al. | 219/10.55 E |
| 5,021,293 | 6/1991 | Huang et al. | 428/328 |
| 5,041,295 | 8/1991 | Perry et al. | 426/107 |
| 5,185,506 | 2/1993 | Walters | 219/10.55 E |
| 5,189,078 | 2/1993 | Johnson et al. | 523/137 |
| 5,258,596 | 11/1993 | Fabish et al. | 219/10.55 F |

*Primary Examiner*—Paul J. Thibodeau
*Assistant Examiner*—Stephen Sand
*Attorney, Agent, or Firm*—Elroy Strickland

[57] ABSTRACT

A product for heating a load at different rates using microwave radiation provided at a substantially constant power level. The product may include a polymer matrix alone or in combination with a metal substrate, with the polymer matrix located on the surface of the metal substrate that does not contact the load and is thus disposed to the incident microwave radiation. The matrix includes dielectric and magnetic components in amounts that enable at least initial absorption of the incident radiation and thus initial thermalization of the radiation within the matrix. The matrix is designed to change its rate of thermalization and the rate at which it conducts thermalized radiation to the substrate and load after a predetermined time of exposure to the radiation at a predetermined temperature of the matrix.

5 Claims, 1 Drawing Sheet

THERMOSTATING FOIL-BASED LAMINATE MICROWAVE ABSORBERS

BACKGROUND OF THE INVENTION

The present invention relates generally to the heating of loads located within opaque metal foils and containers provided with at least one overlayer containing microwave absorbing material, and certain semi-transparent materials, and particularly to a product that automatically provides time dependent heating of such loads using thermalization of microwave energy by the absorbing material as the primary source of heat.

In U.S. application Ser. No. 670,008 by Fabish et al, filed Mar. 15, 1991, now U.S. Pat. No. 5,258,596, issued Nov. 2, 1993, a system is described that uses microwave reflection, absorption and transmission coefficients attainable with commercially available lossy materials to describe the thermal response of a load to an arbitrary influx of microwave power. Material parameters employed in the system are complex numbers defined by real and imaginary terms that describe the relative magnetic permeability and electric permittivity of the lossy materials at the electromagnetic frequency of interest. The disclosure of the Fabish et al application is incorporated herein by reference.

Heretofore, one practice employed to control cooking time and temperature in thermalizing microwave energy in lossy materials was to use magnetic components having specific Curie temperatures that lay near the maximum desired temperature. Upon approach to the Curie temperature, the magnetic order disappears and heat generation ceases. Such a concept is disclosed in U.S. Pat. No. 2,830,162 to Copson et al and used generally in U.S. Pat. No. 4,266,108 to Anderson et al. In Anderson et al., the thickness of the lossy material is critical and, in addition, rather large so that commercialization of such means is limited.

U.S. Pat. Nos. 4,864,089 and 4,876,423 to Tighe et al show microwave heating mediums for liquid application to microwave transparent substrates. Because the substrate and any containers made therefrom are generally semi-transparent to microwave radiation, the load beneath the substrate or in the container is heated directly by the microwave energy as well as the heat of any thermalization of the radiation within the heating mediums.

The various absorber designs appearing in the literature can be fruitfully discussed within the framework of Maxwell's equations. It is worthwhile to outline here one solution in some detail that is pertinent to understanding the semi-transparent absorber. (A metal-backed absorber is similarly disclosed and discussed in the above incorporated Fabish et al. application.)

Figure 1:
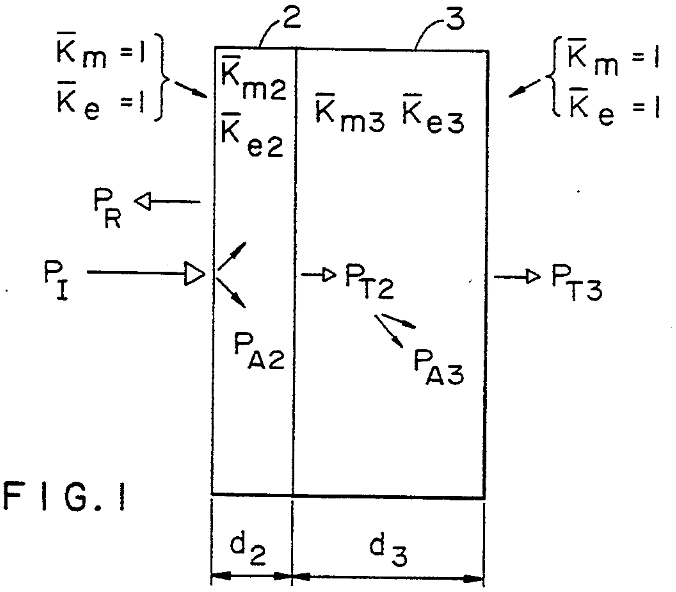

A drawing of a suitable model for this purpose is shown in FIG. 1. The model comprises a semi-transparent polymer film 2 of thickness $d_2$ and intrinsic impedance $\bar{z}_2$, which is adjacent to free space on its left, the free space having an intrinsic impedance $z_0$ ($=377\Omega$). A second polymer film 3 is located on the right of film 2, film 3 having a thickness $d_3$ and an intrinsic impedance $\bar{z}_3$. Free space is also located to the right of film 3. The bar over the z denotes a complex quantity.

$z_L$ is the impedance of the combination of films 2 and 3 exposed to a normally incident microwave power, $P_I$, and is given by the following equations:

$$\frac{\bar{z}_L}{z_0} = \frac{\bar{z}_2}{z_0}\left[\frac{\frac{\bar{z}_T}{z_0} + \frac{\bar{z}_2}{z_0}\tanh \bar{\Gamma}_2 d_2}{\frac{\bar{z}_2}{z_0} + \frac{\bar{z}_T}{z_0}\tanh \bar{\Gamma}_2 d_2}\right], \quad (1)$$

$$\frac{\bar{z}_T}{z_0} = \frac{z_3}{z_0}\left[\frac{1 + \frac{\bar{z}_3}{z_0}\tanh \bar{\Gamma}_3 d_3}{\frac{\bar{z}_3}{z_0} + \tanh \bar{\Gamma}_3 d_3}\right]$$

Power absorbed in film 2:

$$\frac{P_{A2}}{P_I} = (1 - |\bar{R}|^2)(1 - e^{-2\alpha_2 d_2}). \quad (2)$$

Power transmitted through film 2:

$$\frac{P_{T2}}{P_I} = (1 - |\bar{R}|^2)e^{-2\alpha_2 d_2}. \quad (3)$$

Power absorbed in film 3:

$$\frac{P_{A3}}{P_I} = (1 - |\bar{R}|^2)e^{-2\alpha_2 d_2}(1 - e^{-2\alpha_3 d_3}). \quad (4)$$

Power transsmitted through film 3:

$$\frac{P_T}{P_I} = \frac{P_{T3}}{P_I} = (1 - |\bar{R}|^2)e^{-2\alpha_2 d_2}\, e^{-2\alpha_3 d_3}. \quad (5)$$

Total absorbed power:

$$\frac{P_A}{P_I} = \frac{P_{A2}}{P_I} + \frac{P_{A3}}{P_I} = (1 - |\bar{R}|^2)(1 - e^{-2\alpha_2 d_2}\, e^{-2\alpha_3 d_3}). \quad (6)$$

Total power reflected by films 2 and 3:

$$\frac{P_R}{P_I} = |\bar{R}|^2. \quad (7)$$

Note that $$\frac{P_A}{P_I} + \frac{P_R}{P_I} + \frac{P_T}{P_I} = 1, \quad (8)$$

as it must to conserve energy.

The definitions of the terms in Equations 1 to 8 are given below and on pages 18 to 21 of the above incorporated Fabish et al. application. Equations 2 through 8 enable calculation of power absorption $P_A$ under boundary conditions that generally represent packaging applications using transparent and semi-transparent materials, namely, lossless and lossy dielectric materials, respectively. The results of the calculation permit a meaningful comparison with the performance of the D-layer disclosed in the above Fabish et al. application and shown in FIG. 2 of the drawing in the present application.

Figure 2:
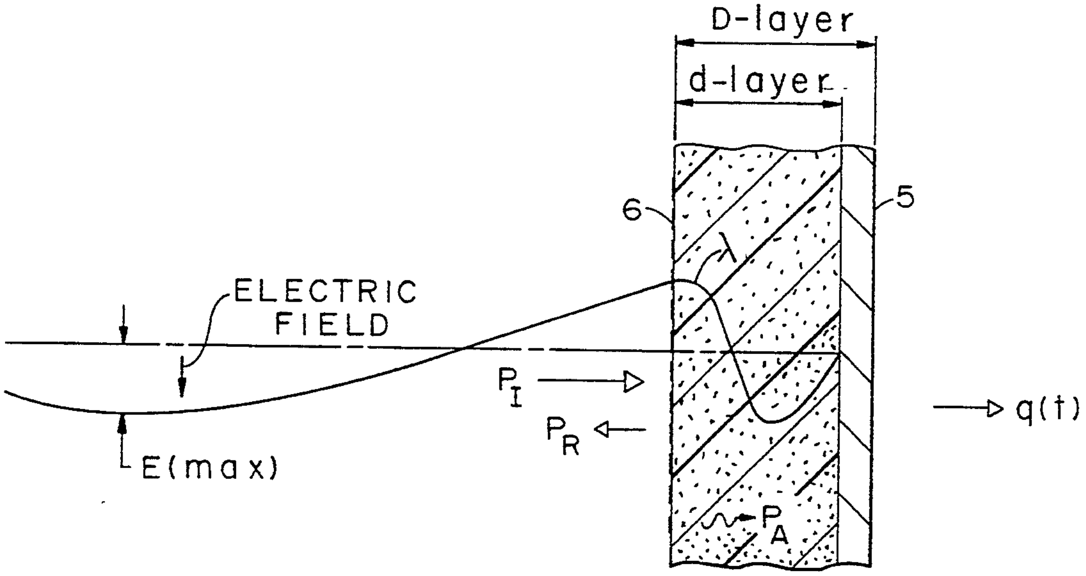

The metal-backed absorber (D-layer) discussed in the above incorporated Fabish et al. application is attained from FIG. 1 by letting material 3 become a metal of sufficient thickness to prevent any power transmission through its thickness $d_3$. The case where the metal is a perfect conductor and the transverse electromagnetic wave (TEM) is normally incident on a semi-infinite planar surfaces (FIG. 2) described by:

$$\bar{z}/z_0 = [\bar{K}_m/\bar{K}_e]^{\frac{1}{2}} \tanh \bar{\Gamma} d \quad (9)$$

where for all cases in Equations 1 to 9:

the bars denote a complex quantity;

$z = \bar{E}/\bar{H}$ is the (complex) impedance of the films or D-layer;

$z_0=[\mu_o\epsilon_o]^{\frac{1}{2}}$ is the characteristic impedance of free space, where $\mu_o$ and $\epsilon_o$ are the permeability and permittivity of free space, respectively, and $z_0=377\Omega$ in the MKS system of units (an unoccupied oven cavity space is taken as free space ignoring the relatively small corrections to $\lambda_o$ for wave propagation in the cavity);

$$\overline{\Gamma}=i(-\omega/c)\,[\overline{K}_m\overline{K}_c]^{\frac{1}{2}}=\alpha+i\beta$$

which defines the wave propagation factors in the medium:

$\alpha$=real $\overline{\Gamma}$=absorption coefficient, $cm^{-1}$ in the lossy layer;

$\beta$=imag $\overline{\Gamma}$=phase factor, $cm^{-1}$ in the lossy layer;

$\lambda=2\pi/\beta$=wavelength, cm, within the lossy layer;

$\omega=2\pi v$=circular frequency, radian/sec, of the transverse electric wave (TEM);

c=speed of light in vacuum=$3\times10^{10}$ cm/sec;

The electric and magnetic field vectors of the propagating microwave are, respectively, $\overline{E}=E_0e(-\overline{\Gamma}x-i\omega t)$ and $\overline{H}=H_0e(-\overline{\Gamma}x-i\omega t)$ where, in the TEM mode, $\overline{E}$ and $\overline{H}$ are normal both to one another and to the direction of wave propagation;

$\overline{K}_e=K_{er}+iK_{ei}$ is the effective medium electric permittivity unique to each of the dielectric layers of FIG. 1 and the particulate/molecular composite lossy layer of FIG. 2. $\overline{K}_e$ is defined relative to free space, and is frequency sensitive in the microwave region for materials of interest. $\overline{K}_e$ is also known as the dielectric response function in accordance with the terminology of linear response theory;

$\overline{K}_m=K_{mr}+iK_{mi}$ is the effective medium magnetic permeability of the layers in FIGS. 1 and 2. $\overline{K}_m$ is defined relative to free space, and is frequency sensitive in the microwave region for materials of interest. $\overline{K}_m$ is also known as the magnetic response function in accordance with the terminology of linear response theory. $\overline{K}_e$ and $\overline{K}_m$ together are often referred to as the effective medium optical constants of the composite layer. Note that $\overline{K}_m=1$ for non-magnetic dielectric materials such as those envisioned for the application depicted in FIG. 1.

The amplitude reflection coefficient (complex number) of the structures of FIGS. 1 and 2 is:

$$\overline{R}=[[(z/z_o)-1]/[(\overline{z}/z_0)+1]] \quad (10)$$

Where $\overline{z}=\overline{z}_L$ as given by Equation 1 for a free standing stack of two dielectric films (FIG. 1), and $\overline{z}$ is given by Equation 9 for a metal-backed dielectric film.

Power absorption in all cases is given by:

$$G(total)=P_I[1-|\overline{R}|(d,\omega,\overline{K}_m,\overline{K}_e)|^2|[ \quad (11)$$

where $P_I$ is the power density, $cal/cm^2$ sec, incident on the film structure. In the present applications, the frequency of the microwave is fixed at that of consumer microwave ovens, approximately 2.45 GHz.

Finally, d of Equation 9 is the thickness in cm of the composite lossy layer located on the metal substrate in FIG. 2.

Two boundary conditions are next considered for a semi-transparent film (Equations 1 to 8 and FIG. 1) capable of absorbing microwave radiation. In the first condition, film 3 is replaced by free space. Calculations, using the above Equations 1, 2 and 3, provide the attenuation of the incident power density $P_I$ for various film thicknesses and the film's $\overline{K}_e$, which is the film's electric permittivity relative to free space, or its "dielectric response function" as previously defined. In the second example, film 3 is 4 cm of water where the water is fully represented by an appropriate (complex) dielectric response function. The modulation in the reflection coefficient that occurs as the thickness of the water film is increased is fairly well damped at water thicknesses greater than 2.7 cm, so that the second example emulates the use of the semi-transparent film in a package with air on the outside and a water load on the inside, like heating a cup of coffee. Again, the relevant variables are film thickness and film $\overline{K}_e$. The $\overline{K}_e$ of the film can be engineered over several orders of magnitude in the values of its real and imaginary terms through choice of dielectric additives to the polymer of the film. These additives can be in molecular or particulate form. The objective of the present calculation is to learn how effective a semi-transparent film absorber may be under the two boundary conditions for all reasonable values of film thickness and $\overline{K}_e$ values.

The dielectric response functions ($\overline{K}_e$) of air and water differ considerably, which produces a profound effect on the thermalization of microwave energy in the semi-transparent film. By way of example, consider the case of a free standing film loaded with a specially chosen form of particulate carbon. With free space on both sides, a maximum absorption of 28% of the incident microwave power in the film is shown to occur using Equations 1 to 3 and independently measured $\overline{K}_e$ near a film thickness of 30 mil and a loading of 7 to 8 wt % carbon. Practical film thicknesses for packaging applications generally do not exceed 5 mil, for which, in this example, a maximum 10% power absorption is approached at 10% carbon loading. However, carbon loadings above 5% are judged excessive because higher loadings produce excessively high viscosity that effects processability of commercial films, and the resulting films tend to be brittle and so resist forming into packages of appropriate shapes. The calculations show that a 5% carbon film 5 mil thick with air on both sides of the film will absorb 3% of the incident power, reflect 1%, and transmit 96%. Due to the relatively high power densities generated in consumer microwave ovens, 3% power absorption can still represent a beneficial contribution to product heating. By way of comparison, calculation (Equations 8 to 11) and experiment show that the laminated foil concept in the above incorporated Fabish et al. application produces 12% power absorption in the laminate at practical film thicknesses, where "practical" means films that enable useful levels of power absorption while remaining formable into foil containers.

Similar calculation using Equations 1 to 8 for the same carbon loaded film now under the boundary conditions where 4 cm of water replaces air on the right side of the film (the "coffee cup" example) shows that the water dominates the division of power between reflection, absorption, and transmission such that 70% of the incident power is reflected for all combinations of carbon loadings and film thickness considered (0 to 12% carbon loading, 0 to 30 mil film thickness). In other words, the influence of the semi-transparent film on the heating of the load is reduced by a factor of about two thirds when the load assumes a dielectric behavior approaching that of water rather than air. Specifically, the 5% carbon, 0.0127 cm (5 mil) thick film previously discussed converts only 1% of the incident radiation into thermal energy to perform the heating function with the water load compared to 3% with air on both sides. For comparison purposes, this dramatic sensitivity of heating performance relative to the dielectric characteristics of the load does not arise with metal foil containers since the foil electrically isolates the absorbing film from the contents of the container.

The results of our consideration of semi-transparent film absorbers can be invoked to argue quite generally that little control of heating profiles of dielectric loads like foodstuffs can be expected using semi-transparent packaging films of the kind currently found in the marketplace due simply to the fact that such films control only a minor fraction of the power reaching the dielectric load for practical film compositions and thicknesses. In contrast, the foil based microwavable food package can, in principle, provide defined heating profiles for any form of load because all thermal radiation reaching the load is governed by the composite film/metal foil laminate design.

Moreover, in the above Tighe et al patents thermoplastic resins are desired as a particle binder to control to some degree particle-to-particle contact, and such control is stated to be related to a "glass transition temperature". At this temperature, the binder is said to expand so that at some point particle-to-particle contact is lost, thereby preventing further heating until the binder cools and contracts, making the particles again contiguous. However, this concept appears unsupportable in view of our previous calculations of power absorption in semi-transparent films and the fact that no known theory or experiment supports the claim that a glass transition provides volume expansion to move particles out of contact at the particulate loadings given in Column 7 of U.S. Pat. No. 4,876,423.

SUMMARY OF THE INVENTION

The present invention is directed to several techniques that inherently and automatically, and individually or in combination, control heating rates in lossy materials either alone or located on an opaque metal foil substrate. The combination of lossy material and metal foil forms the active D-layer disclosed in the above incorporated patent application, and shown in FIG. 2 of the drawing of the present application. The metal substrate ensures that no fraction of incident electromagnetic wave is transmitted through the layer to the load though, to a minor extent (which can be accounted for by Equation 11), the microwave is partially thermalized in the metal substrate as the metal is an imperfect electrical conductor and therefore an imperfect reflector. The lossy overlayer of the combination includes at least one dielectric component that is effective to compress the wavelength of the incident microwave radiation while simultaneously preserving useful impedance for heating, the impedance being set mainly by a magnetic component in the lossy layer. Useful power absorption within the layer is thereby obtained and is obtained within the range of commercial thicknesses generally employed for lossy layers. In the case of most semi-transparent substrates, power absorption is obtained through the dielectric response function set by the dielectric particulate loadings which are constrained by manufacturing processes and the formability of the substrates into suitable package shapes.

The general objective of the invention is to engineer into the optical and thermal transport properties of lossy materials programmable responses to microwave radiation for purposes of controlling heating and cooking temperature solely through materials design. In the vernacular, the objective is a "smart package", that provides an appropriate amount of heat based solely on the materials interaction with incident microwave energy held at a constant power level, which is the case in consumer microwave ovens. By way of example, the subject design strategy contrasts with that of metal containers being particularly shaped to meet some configuration criteria that is deemed necessary to make use of wave propagation modes operating within an oven cavity.

A specific objective of the invention is to provide time-dependent heating of a lossy material or layer, the heating process starting with an initial high heating rate, for example, then using a thermostating mechanism designed into the lossy layer to reduce the heating rate. The amount of microwave energy needed to achieve heating rates can be calculated using the Equations 1, 2 and 3, as disclosed in the above Fabish et al. application and repeated in Equations 9 to 11 herein.

A further specific objective of the invention is to provide a microwave heatable layer that operates at a relatively cool level, i.e., with small differences in temperature between the outer surface of the absorber and the load due to the efficiency of the transport of thermal energy through the layer to the load. The thermal transport efficiency for metalized semi-transparent films presently in the marketplace is entirely determined by the polymer. Such films tend to run hot, "hot" being a temperature level well above load temperature. High temperature with low thermal transport appears to be satisfactory for browning and crisping certain foods but may test the thermal stability of the polymer film. Thermal transport can be increased in semi-transparent films by loading the polymer with crystalline dielectric particulates having good intrinsic thermal conductivity, but attention must be paid to the effect of the dielectric additive on the division of the incident power between reflection, absorption in the film, and transmission through the film as given by the equations that determine such distribution (Equations 1 to 8 herein).

THE DRAWINGS

The objectives and advantages of the invention will be better understood by consideration of the following detailed description and the accompanying drawing in which:

FIG. 1 is a schematic view of a two film laminate free standing in air for modeling microwave power absorption in a semi-transparent film, and FIG. 2 is a schematic view of the foil-based D-layer of the present invention, which layer, when properly designed, provides programmed heating and heat conducting responses to microwave absorption.

PREFERRED EMBODIMENTS

Referring now to FIG. 2 of the drawing, a laminate D-layer is shown which comprises a metal foil 5 and a polymer matrix of lossy material, designated "d-layer", located on the outside of the foil towards the incident microwave. A thin film of material 6 is located on the surface of the matrix opposite that of the foil to improve the match of the impedance of the D-layer with that of free space.

A fraction of an incident transverse electromagnetic wave (TEM) of microwave radiation is shown entering the d-layer through film 6. A complementary fraction of the incident power density is reflected ($P_R$) from the D-layer due to imperfect matching of its impedance to free space. The power density of the incident wave is designated by $P_I$. As explained in the above-referenced application, the optical properties of the metal foil 5 and its thickness are typical of those employed in commercial packaging applications, with no fraction of the incident microwave being transmitted through the foil to a load (not shown). Hence, power absorption $P_A$ is the difference between $P_I$ and $P_R$.

The bold arrow and the designation q(t) in FIG. 2 represent the flow of heat generated within the d-layer through metal foil 5 to a load. Heat is generated by the portion of the incident radiation interacting with lossy materials contained in the matrix of the d-layer and, to a lesser extent, with the lossy thin film 6. The wavelength of the radiation propagating within the d-layer is designated by λ which is considerably smaller than the free space wavelength of the incident microwave.

The D-layer is designed and engineered using equations disclosed in the above Fabish et al. patent and applied in detail herein to provide a time-temperature profile tailored to a specific load so that the load is heated and/or cooked in a proper manner, after which the heating or cooking automatically either ceases or is reduced. For example, accelerated cooking may cease, but moderate heating may continue so that the food load can be optimally finished and served in a heated condition. Alternatively, accelerated cooking may be preferred at the end of the heating profile to effect browning/crisping as the finishing touch.

The former heating profile can be provided at least partially by thin film 6. As explained in the above incorporated application, such a film can contribute a significant amount of heat in the process of using the D-layer to heat a load. The film is very thin, i.e., on the order of 100 nanometers, and is comprised of a metal, semimetal, or semi-conductive material in a continuous or island structure depending on the electronic transport characteristics of the particular material employed. Such a film assists heating through electric field driven $I^2R$ losses operating at the spatial location of the film. Since the film is extremely thin, a significant change in its dimension and/or composition can be made to occur after reaching a certain temperature. This is accomplished through a temperature-induced metal oxidation process that may involve the evolution of volatile gaseous species or through a temperature-induced metal-to-insulator transition other than oxidation in which the metals or semi-metals alter their basic structure from a relatively conductive form to an electrically insulating form. Such a species therefore becomes locally transparent to the incident radiation on the basis of a predetermined time at a predetermined temperature.

Film 6 can thus be designed with a prescribed structural transition rate so that after a predicted time at a predetermined temperature its contribution to heat generation and to the flow of heat q(t) through metal foil 5 to the load ceases or is reduced substantially. In this way, desirable food cooking profiles can be achieved. Such a control mechanism is commonly irreversible so that it will work only one time.

Another example in obtaining a decrease in the operating temperature of microwavable foil to a predetermined load temperature employs an intercalated particulate as one ingredient of the particulate mixture comprising the active overlayer (d-layer) for aluminum sheet. Examples of appropriate particulates are 1 to 10 micrometer diameter particles of layered materials like graphite, graphite oxide, or pillared clays. Such materials expand in the direction normal to the intercalant planes by 100% to 200% when various molecules such as amines, ferric chloride, alcohols, or water are allowed to penetrate and settle, i.e., intercalate, between the layers that comprise such particles. In this application, the base particles and intercalant molecule are chosen to produce an expanded, intercalated particle that reverts or shrinks towards the original particles size at a predetermined temperature. The critical application temperature defines the stability limit of the intercalant molecule in the particle. For example, water intercalated into graphite oxide rapidly exits the matrix at a temperature near 100° C. producing an expected particle shrinkage in the direction normal to the intercalant planes in the range of 100% to 200%.

Incorporation of the expanded intercalated particles into the overlayer of FIG. 2 will produce a certain overlayer thickness, d, that is initially chosen to provide optimum impedance match of the overlayer/foil laminate (D-layer) to free space and thus optimum microwave energy absorption. When heating first commences, the heat generation rate will, therefore, be maximum. At the predetermined temperature, the intercalant will exit the particle which will then shrink in size towards its natural dimensions which decrease d by a significant amount. The decrease in thickness, d, enhances the mismatch in impedances and lowers the heat generation rate within the d-layer, thus reducing product temperature. Note that this practice manages the heat generation rate rather than the thermal conductance of the d-layer.

A method for increasing the operating temperature of microwavable material to a predetermined load temperature involves using, as one ingredient of the particulate mixture comprising the active material, a filler of glass or polymer microspheres that encapsulate a liquid, e.g., water or a solid that volatilizes at a specified temperature. Initially, at the start of heating, the encapsulated liquid or solid will act to enhance the rate of heat generation and thermal transport efficiency through the high dielectric response and high intrinsic thermal conductivity of the liquid or solid. Enhancements of heating rate of any magnitude are generally welcome at the start.

As discussed in Applicants' U.S. Pat. No. 5,258,596, which is incorporated herein by reference, additional dielectric particles include aluminum flake, carbon block and ferroelectric crystal of perovskite structure. Magnetic particles include iron and ferrite, as discussed in the patent.

However, as the temperature level of the lossy material (which is quite near that of the load in the subject concept) approaches the design temperature, the encapsulant will begin to volatilize and escape through the matrix of the overlayer to the surrounding atmosphere. Depletion of this filler acts to lower the thermal conductance of the overlayer since the microspheres now represent empty pores which are much less conductive than the original filled microspheres. Moreover, the volatilization process can further increase the effective porosity of the overlayer through promoting microcracking of the matrix, thereby further decreasing thermal conductance. If water is the encapsulated material, volatilization will onset near 100° C.

It should be noted that as the thermal conductance decreases with volatilization, the rate of heat generation occurring within the lossy material will remain essentially constant in the case of the laminate of FIG. 2 wherein the heat generation rate is predominantly governed by the concentration of magnetic material in the d-layer. Thermal transport theory insures that the temperature will increase under these conditions, thereby encouraging, for example, desirable conditions for browning or crisping an enclosed food product.

Features that are common to the above two examples are, first, that the degree of influence of the raw particulate on performance can be controlled through the particulate design and through the concentration of the particulate(s) employed. Secondly, both processes are irreversible; each will work just one time.

It is also possible to combine the last two examples in the same layer so that through proper selection of the volatiles, the layer can be made to experience an increase in temperature onsetting at a predetermined temperature (to brown and crisp a food product, say) followed by a decrease in temperature that might optimally finish the preparation (or simply keep a food product warm until served).

The above examples are concepts for engineering the heating profile of a load contained within an overlayer/foil laminate D-layer package by means of materials design. The concepts act through physical and chemical processes that are benign towards the load and that require no intervention by the user.

Another example of providing a suitable heating profile in the invention is to utilize a polymer blend or spiro type polymers in the lossy layer matrix that have the property of physically contracting (or expanding, as discussed below) at a desired operating temperature. Matrix contraction acts to decrease power absorption by reducing the thickness of the lossy layer, thereby worsening the impedance match of the layer to the incident TEM. Under constant oven power exposure, the matrix of the layer continuously cycles through a transition temperature, thus maintaining a constant average heating and/or cooking temperature, as this control mechanism is reversible.

Conversely, a matrix that expands at a desired critical temperature acts to enhance heat generation rates of the layer by increasing its impedance match to free space, and especially a D-layer having the impedance matching film 6. If one chooses to also simultaneously employ particulate densities near the "percolation threshold for thermal transport", sufficient matrix expansion will coincidentally lower thermal transport efficiency within the lossy layer, as explained in detail below, thereby increasing its operating temperature. A dielectric particulate that is designed to exfoliate within the prescribed temperature range will produce matrix expansion sufficient for this purpose.

Combining two phase changes in two layers, e.g., expansion and contraction in the d-layer and transition changes in layer 6, and two different critical temperatures, provides specific time-temperature profiles for sophisticated cooking applications.

Hence, the temperatures at which the materials of the invention operate can be specified (engineered) for each type of load or food it is desired to heat and/or cook. Also, an acceptable average response inclusive of many types of food loads can be designed. The present design methodology is accomplished without concern for package shape thereby utilizing the microwave propagation modes normally operating within an average, loaded oven cavity to accomplish the goal of prescribed load heating profiles.

Lastly, the heating profile of a load contained in the semi-transparent film (FIG. 1) and the metal/overlayer laminate (FIG. 2) may be controlled purely by attention to the thermal transport properties of the composite layer as distinguished from designed variations in the optical properties of the overall layer discussed earlier. The particulate loadings employed in the present devices naturally lie or can be made to lie near a "percolation threshold", which threshold controls the efficiency of transport of heat energy through the polymer matrix to the load or to the foil and thus to the load. More particularly, polycrystalline metallic or dielectric particulates typically exhibit thermal transport properties greatly superior to those of the surrounding polymer matrix. Percolation threshold involves the amount of particulate loading or concentration within the matrix. If the loading is "high" so that the particulates in the polymer have an interparticle spacing that is small enough to allow large particle-to-particle coupling of thermal phonons and, in the case of metallic particulates, the additional coupling of electronic charge carriers, efficient thermal transport takes place. (Electronic charge carriers can transport a significant fraction of the net thermal energy.) Because of the ability of such a matrix to transport thermal energy through itself to the load or through foil 5 to the load (a result of the good heat conductivity of the metal foil), the polymer matrix and foil run relatively cool in the heating and/or cooking process in the event particulate loadings lie near or above percolation threshold.

Tests have shown the thermal transport properties of the lossy layer to be a governing factor in the thermal balance that is achieved between the load and the microwave absorber throughout the course of a microwave heating application. Hence, a matrix phase change that can be engineered through appropriate blending or alloying of particulates and polymer and that drives the particulate packing either beyond percolation threshold with matrix contraction or below percolation threshold with matrix expansion will thermostat the load during the heating cycle.

The ability to engineer a programable response into the impedance and/or thermal transport component of the heating layer or layers enables control of load and absorber temperature solely through materials design. As an example, the crisping or browning of foods requires a relatively low heat generation rate but high temperature, whereas cooking to an "acceptable" finished state is best accomplished at high heat generation rate at a lowered average temperature. The demand of high temperature in the metal laminate structure is met by increasing the heat generation rate by the means prescribed herein which automatically allows for subsequent reduction to achieve cooking and finishing, or the sequence may be reversed to effect browning/crisping at the end of the cooking cycle, the choice being determined by optimal product appeal.

While the invention has been described in terms of preferred embodiments, the claims appended hereto are intended to encompass all embodiments which fall within the spirit of the invention.

What is claimed is:

1. A laminate for heating a food load at different rates using microwave radiation, said laminate comprising:

a continuous metal substrate opaque to microwave radiation; and a polymer matrix overlayer located on one side of the opaque metal substrate for receiving microwave radiation incident upon the polymer matrix overlayer;

said overlayer comprising a layer of polymer material having a predetermined thickness and containing dielectric and magnetic particles that provide a favorable impedance match of the laminate, as comprised of the overlayer and microwave opaque metal, to the microwave radiation incident from free space such that the particles of the overlayer interact with the electric and magnetic components of the microwave radiation wherein primarily magnetic losses occur thereby enabling absorption of a portion of the incident radiation and thus conversion of said radiation to heat within the overlayer, said dielectric particles including aluminum flake, carbon, graphite, pillared clays or ferroelectric crystals of perovskite structure, and combinations thereof, while said magnetic particles include iron or ferrite, or both;

said particles providing, after a predetermined time of exposure to the radiation at a predetermined temperature of the overlayer, an increase or a decrease in the amount of the interaction and absorption, and thus providing an increase or decrease in the amount of heat generated;

said particles having a heat conducting capability and a bulk density in the polymer overlayer that provides particle-to-particle coupling of thermal phonons through the overlayer to the opaque substrate at a rate that can increase or decrease at a predetermined time of exposure to the radiation at a predetermined temperature of said matrix overlayer.

2. The laminate of claim 1 including an electrically resistive film comprised of metals or semi-metals located on the surface of the polymer matrix opposite that of the opaque metal substrate, said film being employed to augment the impedance match of the overlayer and substrate with free space, said film, in addition, generating heat when exposed to microwave radiation, further having a predetermined rate at which volatile oxidation of the metals or semi-metals occurs at a predetermined time of exposure to said radiation at said predetermined temperature, after which the contribution of the heat generated by the electrically resistive film is eliminated or substantially reduced.

3. The laminate of claim 1 in which the polymer overlayer contains minute, layered particles of graphite, graphite oxide or pillared clays, or combinations thereof, and intercalant molecules including alcohol or water, as ingredients of the overlayer.

4. The laminate of claim 1 in which the polymer overlayer contains layered particles and intercalant molecules including alcohols or water, and glass or polymer microspheres that encapsulate a liquid or solid that is capable of volatilizing at a specified temperature.

5. The laminate of claim 1 in which the polymer overlayer changes its thickness after a predetermined period of time at said predetermined temperature, said thickness change altering the electrical impedance of the matrix such that absorption of the radiation in the matrix is changed.

* * * * *

UNITED STATES PATENT AND TRADEMARK OFFICE

CERTIFICATE OF CORRECTION

PATENT NO. : 5,391,430

DATED : February 21, 1995

INVENTOR(S) : Thomas J. Fabish et al

It is certified that error appears in the above-identified patent and that said Letters Patent is hereby corrected as shown below:

| | |
|---|---|
| Title page, beneath "Assignee: Aluminum Company of America" | Insert the following: --The portion of the term of this patent subsequent to November 2, 2010 has been disclaimed.-- |

Signed and Sealed this

Fifth Day of September, 1995

Attest:

Bruce Lehman

BRUCE LEHMAN

*Attesting Officer*

*Commissioner of Patents and Trademarks*